May 13, 1952 M. F. PETERS 2,596,284
METHOD OF FORMING THERMISTOR BY IMPREGNATION
Filed Sept. 15, 1949
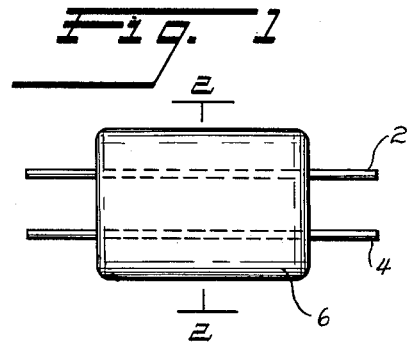
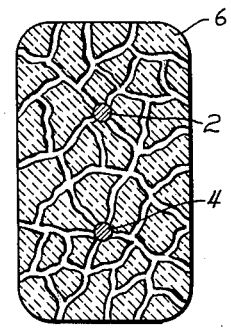
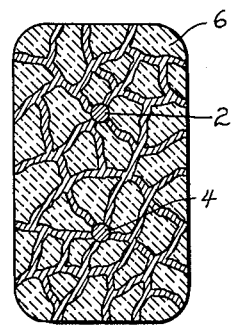
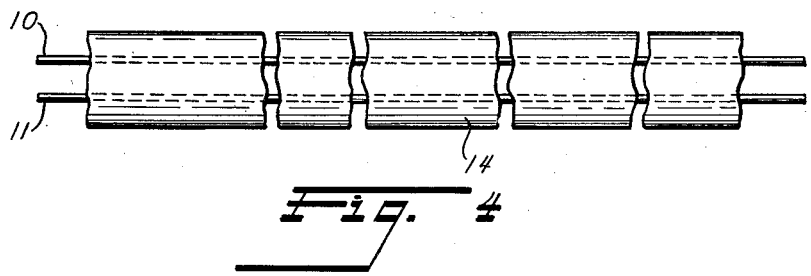
INVENTOR
MELVILLE F. PETERS
BY Scrivener & Parker
ATTORNEYS Patented May 13, 1952

2,596,284

UNITED STATES PATENT OFFICE 2,596,284

METHOD OF FORMING THERMISTOR BY IMPREGNATION

Melville F. Peters, East Orange, N. J., assignor to Petcar Research Corporation, Newark, N. J., a corporation of New Jersey Application September 15, 1949, Serial No. 115,937

4 Claims. (Cl. 18—47.5)

This invention relates to temperature-sensitive resistance elements of the type which consists of two or more electrical conductors embedded in a body the electrical resistance of which changes with change in temperature, whereby the body substantially insulates the conductors from each other at one temperature or range of temperatures and at another temperature or range of temperatures provides an electrically conductive path between them. Such a device has many uses among which is that of an element adapted to be disposed in a space to be monitored for undesired high temperature, in which use it is operative to effect the energization of an alarm, indicator or control circuit on increase in temperature to a predetermined degree, for example that of combustion of some material within the space. In one form in which such devices are used the material in which the conductors are embedded is dis-continuous longitudinally of the conductors by which it is meant that the material is subdivided into "beads" which are separated by cracks in the material which are, in general, normal to the conductors.

In the use of devices of the type described, i. e. comprising two spaced conductors embedded in temperature-sensitive resistance material, it is usually desirable or necessary that the material establish a conductive path between the two conductors at a specified temperature and that this operation take place exactly at, or very close to, such temperature. In the manufacture of thermistor materials by heretofore known methods this exactness of operation has only been achieved by the use of chemically pure materials mixed in exact proportions under carefully controlled conditions. For example, only the purest materials have been used and these have been very carefully blended, extruded and fired until an exact chemical equilibrium has been established, producing a material which has a certain resistance at a certain temperature, both of which are within very close limits of accuracy. It will be obvious that manufacture of temperature-sensitive resistance material under such conditions is a very laborious and expensive operation.

The principal object of the invention, which is accomplished by the methods set forth herein, has been to provide a method of making thermistor elements which does not require ingredients of high chemical purity or the processing thereof under closely controlled conditions, but which permits the production of a thermistor element having any desired temperature-resistance characteristics from usual, commercial ingredients processed without undue exactitude and without the necessity of laboratory conditions.

A further object has been to provide a method of manufacturing thermistor elements which permits the operating characteristics thereof to be easily controlled or adjusted. Thus, by reason of the invention, usual, relatively impure materials may be used to make thermistor elements which, at the same time, have any desired degree of accuracy or any desired operating characteristics such as a pre-determined resistance at a pre-determined temperature.

In its broadest aspects the present invention consists in first forming a porous coherent body, which in this application is termed a "skeleton," and then impregnating this porous body with materials which, either with or without further treatment, cause the impregnated body to become a thermistor element. The temperature at which the device is operative, i. e. the temperature at which the temperature-sensitive resistance material has a predetermined resistance, may easily be controlled by varying the amounts and proportions of the impregnating material or by using different impregnating materials. It has been found that when this method of manufacturing a thermistor is used the impurities in the skeleton body are masked by the impregnating material and do not affect adversely the characteristics of the impregnating material. Accordingly, by this method thermistor elements may be easily and quickly manufactured and their operative temperature and resistance may easily be controlled.

In the embodiments of the invention described in this application the first step is to form the skeleton body. This may be done in any desired way, one method being disclosed in my co-pending application Serial No. 2,344, now Patent No. 2,495,867, to which reference is made for a full disclosure. This method consists essentially in forming a mixture of materials including at least one ceramic material which becomes coherent when heated, for example by partial or complete fusion or by sintering of the particles composing it, and at least one material which is removed by such heating. I have found that steatite may be used as the ceramic material and flour may be used as the heat-removable material. These materials are thoroughly mixed and then heated, for example to a temperature of 1800° F. at which the flour is removed and the particles of the steatite become wholly or partially fused together, forming a porous but coherent body which, as stated hereinbefore, is referred to in this application as a skeleton. The skeleton may be formed as a single body or, if desired, may be formed as a series of separate beads adhered to one or more wires or other conductors. If the beads are to be formed the method for doing so may be that described and claimed in my co-pending application Serial No. 2,344.

In one method according to this invention, the skeleton body is impregnated with a material which is itself a temperature-sensitive resistance material and the electrical resistance of which accordingly changes with change in temperature, for example having a very high electrical resistance at normal room temperature and a lower resistance at some higher temperature. An example of such an impregnating material is iodine sulfide dissolved in alcohol and, in accordance with this first embodiment of the invention, the skeleton body formed in the manner described hereinbefore may be impregnated with this solution, after which it is dried to remove moisture, which may be done at a temperature of 200° to 300° F. The solution of iodine sulfide in alcohol is not changed or converted to any other material by the drying and itself forms the thermistor material. The finished, impregnated, dried body is a thermistor element.

In another method according to the invention the skeleton body is impregnated with a material which, by a subsequent operation, is changed or converted into a temperature-sensitive resistance material remaining in situ in the skeleton body. This method may be carried out, for example, by impregnating the skeleton body with a soluble metal compound, examples of which are manganese acetate, iron acetate and nickel acetate. After impregnation, the impregnated skeleton body is heated to convert the impregnating material into a temperature-sensitive resistance material. In the case of the three materials referred to above, this may be done by heating at 2000° F. for about three minutes to form manganese oxide, iron oxide or nickel oxide, respectively, all of which are temperature-sensitive resistance materials. It will be apparent that in forming a thermistor element by this method wires having a melting point above the temperature required to convert the impregnating material will be required. Other impregnating materials than those named above may, of course, be used. For example the skeleton body may be dipped in a solution of iron chloride, zinc chloride, iron sulphate, sodium dichromate or other soluble metallic compound which, when heated, changes into an insoluble oxide. The impregnated assembly may be heated at approximately 1600° F. for about 48 hours, causing the impregnating material to change to an oxide and thus imparting the desired temperature-sensitive resistance characteristics to the impregnated body.

In those methods according to the invention involving the conversion of a chloride or sulfate to an oxide, hydrochloric or sulphuric acid may be liberated as a byproduct of the conversion and may adversely affect the wires in some cases. In order to avoid this possible disadvantage an alternative method may be used, in which the skeleton, which has been impregnated with a soluble metallic chloride or sulfate, is dried in air at room temperature or slightly higher and is then immersed in a solution of an alkali hydroxide to form, by chemical action, an insoluble hydroxide and a soluble salt which may be removed by washing or by heating. The insoluble metallic hydroxide is then converted to an oxide, for example by heating, thereby producing a temperature-sensitive resistance material. If the skeleton is originally impregnated with iron chloride the following chemical reaction takes place on addition of the alkali hydroxide:

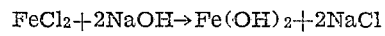

and on heating the $Fe(OH)_2$ dissociates as follows:

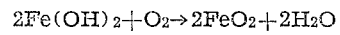

As another example of the method according to which the impregnating material is converted into temperature-sensitive resistance material, the skeleton form may be impregnated with a solution of silver nitrate and then subjected to a hydrogen sulfide atmosphere to convert the silver nitrate to silver sulfide, which has been found to be an excellent temperature-sensitive resistance material.

In some cases it may be desirable to provide a thermistor element comprising one or more wires having beads which are adhered thereto and surround the wires and are spaced along the length thereof and, in case two or more wires are used, provide means for holding the wires in spaced relation. A method of forming such an element is disclosed in my co-pending application Serial No. 2,344, and consists generally in extruding onto the wire or wires a material having at least one ingredient, such as steatite, which becomes coherent and adheres to the wire on heating, and a material, such as flour, which is removed by such heating. The assembly so formed is dried and then heated at approximately 1800° F. for about one-half hour forming beads spaced along the length of the wires and porous because of the removal of the flour by heating. The beads may be made into thermistor elements by any of the methods described in this application.

In the drawings forming part of this application,

Fig. 1 is a side view of a temperature sensitive resistance element of a type which may be formed in accordance with this invention;

Fig. 2 is a sectional view taken on the lines 2—2 of Fig. 1, before impregnation;

Fig. 3 is similar to Fig. 2 but shows the finished thermistor element, and

Fig. 4 is a side view of an elongated beaded temperature-sensitive device.

Fig. 1 of the drawings illustrates a thermistor element comprising spaced, parallel electrically conductive wires 2, 4 which are embedded in temperature-sensitive resistance material 6, such a device being commonly, and in this application, referred to as a thermistor element or device. Fig. 2 of the drawings is a sectional view through the element of Fig. 1 and shows the capillary passages which are formed within the material of the element whereby the porous skeleton form is produced. Fig. 3 illustrates the element of Fig. 2 after impregnation and any required subsequent treatment and shows the thermistor material filling the passages in the element. The passages in the bead are exceedingly small in diameter and the capillary forces therein are therefore very great, whereby if the capillary passages are filled with a material the unit may be operated above the melting point of such material without danger of removing or loosing such material by melting.

Fig. 4 illustrates an elongated, beaded temperature-sensitive resistance device comprising spaced, parallel electrically conductive wires 10, 12 embedded in beads 14 which are spaced along the length of the wires and in which the wires are embedded. These beads may, if desired, be formed by the method described hereinbefore and may be made temperature-sensitive resistance elements in any of the ways also described hereinbefore.

It will be apparent that the impregnation referred to in this application may be performed in any one of a number of ways. One method is to dip the skeleton body, with or without heating. In another method the porous body is placed in an evacuation chamber which is then charged with the impregnating material, whereby full impregnation is assured. Alternatively, the impregnating material may be forced into the skeleton body under pressure.

As stated hereinbefore, the temperature-resistance characteristics of the thermistor element may be easily varied or given any desired values by the method of my invention. The temperature at which a thermistor unit formed by this method will operate, i. e., become conductive at a predetermined temperature will depend on (1) the impregnating material, (2) the concentration of the solution of the impregnating material, or (3) the number of impregnations. In general, increasing the concentration of the impregnating solution lowers the resistance of the unit, causing it to become conductive at a lower temperature. Repeated dipping will also lower the operating temperature of the unit. For example, if a unit is found to have an operating resistance at 1000° F. and it is desired to reduce this operating temperature to 500° F. the unit may be impregnated with a relatively strong solution. If now, it is desired to further reduce the operating temperature to 475° F. the unit may again be impregnated with a very weak solution. By impregnating with weaker solutions any exactness of operating temperature may be achieved.

While I have described certain methods and steps by which my invention may be practised, it will be apparent to those skilled in the art that other methods and steps, as well as modifications of those disclosed may be made without departing in any way from the spirit or scope of the invention for the limits of which reference must be made to the appended claims.

What is claimed is:

1. The method of manufacturing a temperature-sensitive resistance device comprising a plurality of spaced electrical conductors and a plurality of beads each formed of material the electrical resistance of which changes with changes in temperature surrounding and adhered to the conductors and maintaining them in spaced relation, which comprises the steps of forming about spaced conductors a solid continuous cylinder of material containing at least one ingredient which is removed by heating and an ingredient which is made coherent by heating, heating to remove the removable ingredient and make the one ingredient coherent whereby the cylinder of material covering and spacing the wires shrinks longitudinally of the conductors and separates at spaced points along the length thereof to form porous beads, impregnating said beads with a material which is changed by heat to a material the electrical resistance of which changes with change in temperature, and heating said impregnated beads to effect such change in the impregnating material.

2. The method of manufacturing a temperature-sensitive resistance device which comprises two spaced, parallel, continuous electrically conductive wires and a plurality of beads surrounding and fused to the wires and spaced along the length thereof, which comprises the steps of forming about two spaced, parallel, continuous, electrically conductive wires a solid, continuous cylinder of material containing an ingredient which is not electrically conductive and which is at least partially fused by heating and at least one ingredient which is removed by such heating, heating the cylinder of material to dry it and at least partially fuse the fusible ingredient and remove the removable ingredient to form a plurality of beads of porous material surrounding the wires and spaced along the length thereof, impregnating said porous beads with a solution of at least one material which when heated is changed into a material whose electrical conductivity changes with temperature, and heating the impregnated porous beads to effect such change of the impregnating material and fuse the beads to the wires.

3. The method of manufacturing a temperature-sensitive resistance device which comprises two spaced, parallel, continuous electrically conductive wires and a plurality of beads surrounding and fused to the wires and spaced along the length thereof, which comprises the steps of forming about two spaced, parallel, continuous, electrically conductive wires a solid, continuous cylinder of material containing an ingredient which is not electrically conductive and which is fused by heating and at least one ingredient which is removed by heating, heating the cylinder of material to dry it and fuse the fusible ingredient and remove the removable ingredient and form a plurality of beads of porous material surrounding the wires and spaced along the length thereof, impregnating said porous beads with a solution of at least one material which when heated is changed into a material whose electrical conductivity increases with temperature, and heating the impregnated porous beads to effect such change of the impregnating material and fuse the beads to the wires.

4. The method of manufacturing a temperature-sensitive resistance device comprising a plurality of electrically conductive wires and a plurality of beads of material the electrical resistance of which changes with changes in temperature surrounding and adhered to the wires and maintaining the wires in spaced relation, which comprises the steps of forming about parallel spaced wires a solid continuous cylinder of material containing an ingredient which is removed by heating and a material which is fused by heating, heating to remove the removable ingredient and fuse the fusible ingredient whereby the cylinder of material covering and spacing the wires shrinks longitudinally of the wires and separates at spaced points along the length thereof, impregnating said material with a material which is changed by heat to a material the electrical resistance of which changes with change in temperature, and heating to effect such change of the material.

MELVILLE F. PETERS.

REFERENCES CITED

The following references are of record in the file of this patent:

UNITED STATES PATENTS

| Number | Name | Date |
| --- | --- | --- |
| 1,299,846 | McCoy | Apr. 8, 1919 |
| 1,502,763 | Bugbee | July 29, 1924 |
| 1,630,451 | Ray | May 31, 1927 |
| 2,341,219 | Jones | Feb. 8, 1944 |